United States Patent
Gu et al.

(10) Patent No.: US 9,996,401 B2
(45) Date of Patent: Jun. 12, 2018

(54) TASK PROCESSING METHOD AND VIRTUAL MACHINE

(71) Applicant: Huawei Technologies Co., Ltd., Shenzhen (CN)

(72) Inventors: Lin Gu, Hong Kong (HK); Zhiqiang Ma, Hong Kong (HK); Zhonghua Sheng, Hong Kong (HK); Liufei Wen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 237 days.

(21) Appl. No.: 14/738,436

(22) Filed: Jun. 12, 2015

(65) Prior Publication Data
US 2015/0277993 A1  Oct. 1, 2015

Related U.S. Application Data

(63) Continuation of application No. PCT/CN2013/084128, filed on Sep. 24, 2013.

(30) Foreign Application Priority Data

Dec. 14, 2012 (CN) .......................... 2012 1 0543870

(51) Int. Cl.
    *G06F 9/455* (2018.01)
    *G06F 9/52* (2006.01)

(52) U.S. Cl.
    CPC ................ *G06F 9/52* (2013.01); *G06F 9/455* (2013.01); *G06F 9/45558* (2013.01); *G06F 2009/45583* (2013.01)

(58) Field of Classification Search
    CPC ........... G06F 2009/45583; G06F 9/455; G06F 9/45558; G06F 9/52
    See application file for complete search history.

(56) References Cited

U.S. PATENT DOCUMENTS

| 6,721,775 B1 | 4/2004 | Fagen et al. |
| 6,839,816 B2 * | 1/2005 | Borkenhagen ...... G06F 12/0837 711/138 |

(Continued)

FOREIGN PATENT DOCUMENTS

| CN | 101339527 A | 1/2009 |
| CN | 101631328 A | 1/2010 |

(Continued)

OTHER PUBLICATIONS

Partial English Translation and Abstract of Chinese Patent Application No. CN103049334A, May 30, 2015, 4 pages.

(Continued)

*Primary Examiner* — Benjamin Wu
*Assistant Examiner* — Jorge A Chu Joy-Davila
(74) *Attorney, Agent, or Firm* — Conley Rose, P.C.

(57) ABSTRACT

A task processing method and virtual machine are disclosed. The method includes selecting an idle resource for a task; creating a global variable snapshot for a global variable; executing the task, in private memory space in the selected idle resource; after the execution of the task is complete, acquiring a new global variable snapshot corresponding to the global variable, and acquiring an updated global variable according to a local global variable snapshot and the new global variable snapshot; and determining whether a synchronization variable of a to-be-executed task in a task synchronization waiting queue includes the current updated global variable, and if the synchronization variable of the to-be-executed task in the task synchronization waiting queue includes the current updated global variable, putting the task into a task execution waiting queue.

15 Claims, 5 Drawing Sheets

(56) References Cited

U.S. PATENT DOCUMENTS

| | | | | |
|---|---|---|---|---|
| 7,941,616 | B2* | 5/2011 | Rajamani | G06F 9/526 710/200 |
| 2004/0261080 | A1* | 12/2004 | Chan | G06F 9/52 719/310 |
| 2005/0039180 | A1 | 2/2005 | Fultheim et al. | |
| 2007/0198781 | A1* | 8/2007 | Dice | G06F 9/466 711/145 |
| 2007/0198979 | A1* | 8/2007 | Dice | G06F 9/466 718/100 |
| 2009/0300017 | A1* | 12/2009 | Tokusho | G06F 9/52 |
| 2010/0257538 | A1* | 10/2010 | Zhao | G06F 9/4881 718/106 |
| 2011/0161299 | A1* | 6/2011 | Prahlad | G06F 17/30091 707/649 |
| 2012/0151495 | A1* | 6/2012 | Burckhardt | G06F 9/485 718/106 |
| 2012/0311290 | A1* | 12/2012 | White | G05B 23/0264 711/170 |
| 2014/0373026 | A1 | 12/2014 | Gu et al. | |

FOREIGN PATENT DOCUMENTS

| | | |
|---|---|---|
| CN | 101807157 A | 8/2010 |
| CN | 101908002 A | 12/2010 |
| CN | 102629221 A | 8/2012 |
| CN | 103049334 A | 4/2013 |
| DE | 19728971 A1 | 1/1999 |
| GB | 2328299 A | 2/1999 |

OTHER PUBLICATIONS

Foreign Communication From a Counterpart Application, PCT Application No. PCT/CN2013/084128, English Translation of International Search Report dated Dec. 12, 2013, 2 pages.

Foreign Communication From a Counterpart Application, PCT Application No. PCT/CN2013/084128, English Translation of Written Opinion dated Dec. 12, 2013, 8 pages.

* cited by examiner

TASK PROCESSING METHOD AND VIRTUAL MACHINE

CROSS-REFERENCE TO RELATED APPLICATIONS

This application is a continuation of International Application No. PCT/CN2013/084128, filed on Sep. 24, 2013, which claims priority to Chinese Patent Application No. 201210543870.4, filed on Dec. 14, 2012, both of which are hereby incorporated by reference in their entireties.

TECHNICAL FIELD

The present invention relates to the field of computer technologies, and in particular, to a task processing method and virtual machine.

BACKGROUND

In the field of computer technologies, a virtual technology is a technology that enables, by combining or segmenting existing computer resources, these resources to present as one or more operating environments, so as to provide an access manner that is superior to an original resource configuration.

In the related art, multiple X86 systems are aggregated into a virtual symmetric multiprocessor by means of software. A virtual machine monitor or a virtual machine emulator is used to implement virtualization of a physical resource of a single node, so as to provide a unified running environment. Management of a memory by a virtual machine is implemented by means of software, memories in all physical resources are logically considered as an entire memory, and the memory is divided according to a virtual page. When executing a task, the virtual machine randomly selects a task in a waiting queue, and sequentially allocates, in a logical memory, a memory address to the task according to memory space required by related data of the task, which is a mechanism in which the memory is allocated as required.

During a process of implementing the present invention, at least the following problem exists in the related art.

After data of two different tasks is allocated to a same virtual page, the two tasks simultaneously access two different addresses on the virtual page. Because a virtual machine system determines, in a unit of memory page, whether a data conflict exists, a virtual machine considers that the two tasks access the same data. As a result, the virtual machine considers that a data sharing conflict occurs between the two tasks, and interrupts execution processes of the two tasks. However, a sharing conflict does not occur actually, that is, a false sharing phenomenon occurs, which affects execution of the tasks.

SUMMARY

To resolve a problem in the prior art, embodiments of the present invention provide a task processing method and virtual machine. The technical solutions are as follows.

According to a first aspect, an embodiment of the present invention provides a task processing method, including, when an instruction that is for creating a task and that is delivered by a virtual instruction layer is received, selecting, for the task, an idle resource used for executing the task, where the instruction includes at least a start address for running the task, and address information of a global variable and address information of a synchronization variable of the task; acquiring, according to the address information of the global variable, global variable status information corresponding to the address information of the global variable; creating a local global variable snapshot for the global variable according to the global variable status information; executing, in pre-allocated private memory space in the selected idle resource, the task according to the local global variable snapshot; after the execution of the task is complete, acquiring a new global variable snapshot corresponding to the global variable, and acquiring an updated global variable according to the local global variable snapshot and the new global variable snapshot; and determining whether a synchronization variable of a to-be-executed task in a task synchronization waiting queue includes the current updated global variable, and if the synchronization variable of the to-be-executed task in the task synchronization waiting queue includes the current updated global variable, putting the task into a task execution waiting queue; where the task synchronization waiting queue is a queue in which a task waiting for triggering of a synchronization variable is located, and after a synchronization variable of a task in the task synchronization waiting queue is triggered, the task is put into the task execution waiting queue to queue up for scheduling; the task execution waiting queue is a queue in which a task waiting for scheduling and execution is located.

In a first possible implementation manner of the first aspect, the determining whether a synchronization variable of a to-be-executed task in a task synchronization waiting queue includes the current updated global variable, and if the synchronization variable of the to-be-executed task in the task synchronization waiting queue includes the current updated global variable, putting the task into a task execution waiting queue includes selecting, in the task execution waiting queue, a first specific task to be executed by a first idle resource, where address information of a global variable of the first specific task does not conflict with address information of global variables of all currently executed tasks; or selecting, in the task execution waiting queue, a second specific task to be executed by a second idle resource, where address information of a global variable of the second specific task is the same as or is as much similar as possible to address information of a global variable of a task that has been executed by the second idle resource, so as to enhance data affinity.

In a second possible implementation manner of the first aspect, the global variable status information includes a memory address, a creation time and a version tag of the global variable; the creating a local global variable snapshot for the global variable according to the global variable status information includes copying the global variable status information according to the global variable status information, so as to generate the global variable snapshot of the global variable; and correspondingly, the acquiring an updated global variable according to the local global variable snapshot and the new global variable snapshot includes determining whether a version tag in the local global variable snapshot is the same as a version tag in the new global variable snapshot, where if the version tag in the local global variable snapshot is the same as the version tag in the new global variable snapshot, it indicates that the global variable is not updated by another task, and if the version tag in the local global variable snapshot is different from the version tag in the new global variable snapshot, it indicates that the global variable has been updated by another task.

According to the second possible implementation manner of the first aspect, in a third possible implementation manner, after the acquiring an updated global variable according to the local global variable snapshot and the new global variable snapshot, the method further includes, when the global variable is not updated by another task, saving the local global variable snapshot into public memory space in a resource that executes the task, updating a memory address of the global variable to a memory address that is for saving the global variable snapshot and that is of the public memory space in the resource that executes the task, and updating the local global variable snapshot to the local global variable snapshot.

With reference to the first aspect, or the first possible implementation manner or the second possible implementation manner of the first aspect, in a fourth possible implementation manner, after the executing, in pre-allocated private memory space in the selected idle resource, the task according to the local global variable snapshot, the method further includes, if a page fault occurs when the task is being executed, querying an actual status of the memory address of the global variable snapshot; when the memory address of the global variable snapshot corresponding to the task is in public memory space of another resource, copying actual content corresponding to the memory address of the global variable snapshot to a local server; and when the memory address of the global variable snapshot corresponding to the task is in local public memory space, acquiring the global variable snapshot from the local public memory space.

According to a second aspect, an embodiment of the present invention provides a task processing virtual machine, including a scheduler node, a distributed shared memory management node, and a task execution container node; where the scheduler node includes a selecting module configured to, when an instruction that is for creating a task and that is delivered by a virtual instruction layer is received, select, for the task, an idle resource used for executing the task, where the instruction includes at least a start address for running the task, and address information of a global variable and address information of a synchronization variable of the task; a first acquiring module configured to, after the execution of the task is complete, acquire a new global variable snapshot corresponding to the global variable, and acquire an updated global variable according to a local global variable snapshot and the new global variable snapshot; and a determining module configured to determine whether a synchronization variable of a to-be-executed task in a task synchronization waiting queue includes the current updated global variable, and if the synchronization variable of the to-be-executed task in the task synchronization waiting queue includes the current updated global variable, put the task into a task execution waiting queue; where the task synchronization waiting queue is a queue in which a task waiting for triggering of a synchronization variable is located, and after a synchronization variable of a task in the task synchronization waiting queue is triggered, the task is put into the task execution waiting queue to queue up for scheduling; the task execution waiting queue is a queue in which a task waiting for scheduling and execution is located; the distributed shared memory management node includes a second acquiring module configured to acquire, according to the address information of the global variable, global variable status information corresponding to the address information of the global variable; and a creating module configured to create the local global variable snapshot for the global variable according to the global variable status information; and the task execution container node includes an executing module configured to execute, in pre-allocated private memory space in the selected idle resource, the task according to the local global variable snapshot.

In a first possible implementation manner of the second aspect, the determining module includes a first processing unit configured to select, in the task execution waiting queue, a first specific task to be executed by a first idle resource, where a global variable of the first specific task does not conflict with global variables of all currently executed tasks; and a second processing unit configured to select, in the task execution waiting queue, a second specific task to be executed by a second idle resource, where a global variable of the second specific task is the same as or is as much similar as possible to a global variable of a task that has been executed by the second idle resource, so as to enhance data affinity.

In a second possible implementation manner of the second aspect, the global variable status information includes a memory address, a creation time and a version tag of the global variable; the creating module is configured to copy the global variable status information according to the global variable status information, so as to generate the global variable snapshot of the global variable; and correspondingly, the first acquiring module is configured to determine whether a version tag in the local global variable snapshot is the same as a version tag in the new global variable snapshot, where if the version tag in the local global variable snapshot is the same as the version tag in the new global variable snapshot, it indicates that the global variable is not updated by another task, and if the version tag in the local global variable snapshot is different from the version tag in the new global variable snapshot, it indicates that the global variable has been updated by another task.

According to the second possible implementation manner of the second aspect, in a third possible implementation manner, the scheduler node further includes an updating module configured to, when the global variable is not updated by another task, save the local global variable snapshot into public memory space in a resource that executes the task, update a memory address of the global variable to a memory address that is for saving the global variable snapshot and that is of the public memory space in the resource that executes the task, and update the local global variable snapshot to the local global variable snapshot.

With reference to the second aspect, or the first possible implementation manner or the second possible implementation manner of the second aspect, in a fourth possible implementation manner, the task execution container node further includes a querying module configured to, if a page fault occurs when the task is being executed, query an actual status of the memory address of the global variable snapshot; a copying module configured to, when the memory address of the global variable snapshot corresponding to the task is in public memory space of another resource, copy actual content corresponding to the memory address of the global variable snapshot to a local server; and a third acquiring module configured to, when the memory address of the global variable snapshot corresponding to the task is in local public memory space, acquire the global variable snapshot from the local public memory space.

Technical solutions provided in the embodiments of the present invention brings the following beneficial effects.

By sensing a global variable of each task when scheduling and executing the task, and properly allocating a memory to the global variable of the task when scheduling the task, a virtual machine tries, as much as possible, to make that memory addresses of global variables of various tasks do not conflict with each other, thereby reducing overheads that are generated, with the purpose of maintaining memory consistency, by a virtual machine system, and improving scalability of the virtual machine system.

BRIEF DESCRIPTION OF THE DRAWINGS

To describe the technical solutions in the embodiments of the present invention more clearly, the following briefly introduces the accompanying drawings required for describing the embodiments of the present invention.

DETAILED DESCRIPTION

To make the objectives, technical solutions, and advantages of the present invention clearer, the following further describes the embodiments of the present invention in detail with reference to the accompanying drawings.

Embodiment 1

Figure 1:
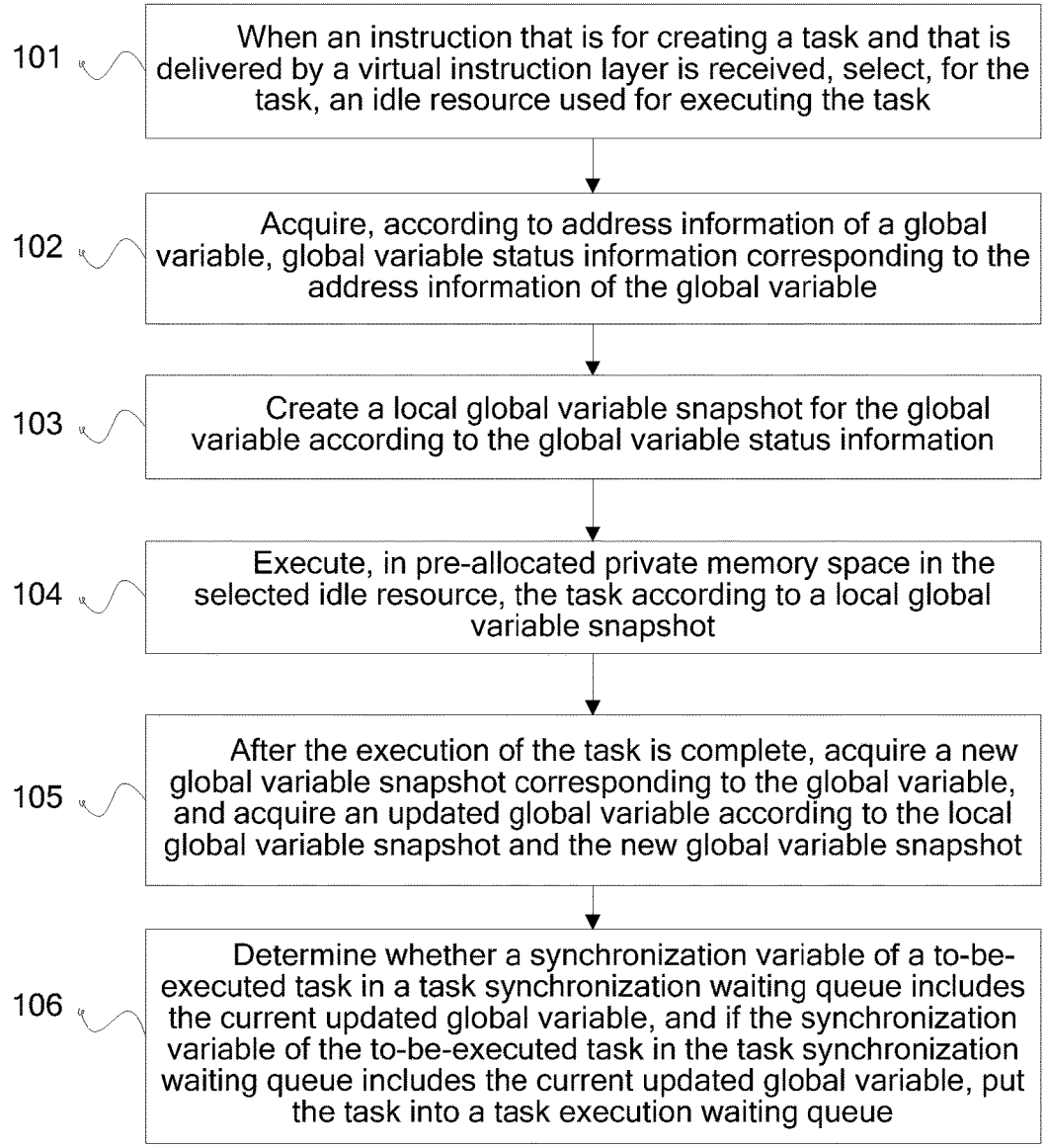
FIG. 1 is a flowchart of a task processing method according to Embodiment 1 of the present invention.

Referring to FIG. 1, this embodiment of the present invention provides a task processing method.

It should be noted that, the present invention implements, based on an application layer virtualization technology (an instruction set architecture) at a middleware level, a single system image of a cluster system, proposes a virtual instruction set of a task level, and establishes, based on the instruction set, a single system image. A slack transaction memory consistency model is established by sensing a task and by using a distributed shared memory model that is based on a page, and overheads that are generated, with the purpose of maintaining memory consistency, by a system, are reduced by properly optimizing distribution of memories required by the task, thereby improving scalability of the system.

Figure 2:
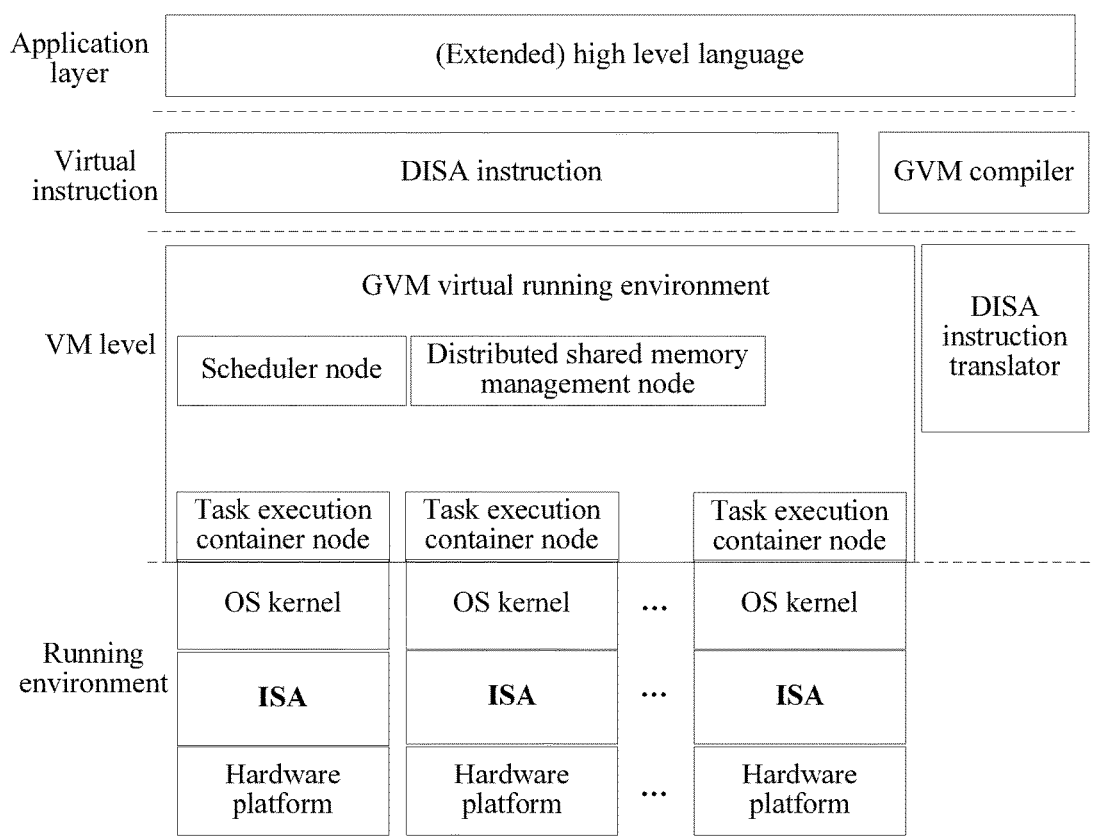
FIG. 2 is a schematic structural diagram of an overall architecture of a virtual machine in the task processing method according to Embodiment 1 of the present invention.

As shown in FIG. 2, an overall architecture of a virtual machine that performs task processing in this embodiment of the present invention is as follows.

A data center virtual machine (DVM) includes a data center virtual machine instruction set architecture (DISA), a data center virtual machine virtual running environment, and a data center virtual machine bottom-layer running environment and upper-layer application.

The DISA is a virtual instruction layer, which is applied to a DVM architecture, and may be used for computing and controlling the data center virtual machine. The data center virtual machine instruction set architecture is a programming interface provided by the DVM for a programmer and a compiler developer.

The data center virtual machine bottom-layer running environment includes a hardware platform of a large-scale computing node, an instruction set, and an operating system kernel.

Figure 3:
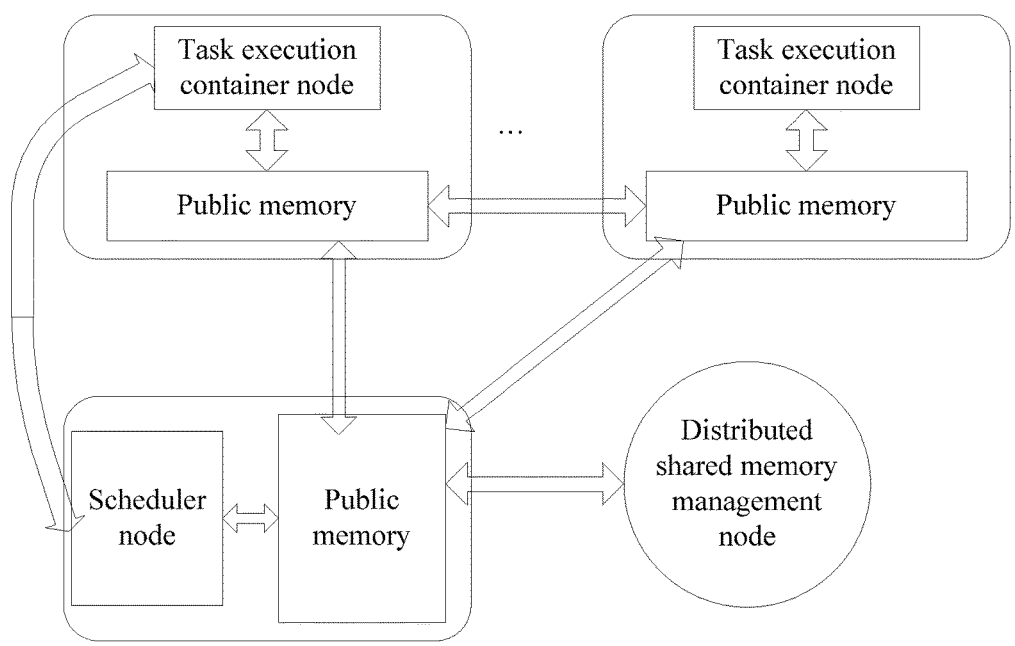
FIG. 3 is a schematic structural diagram of nodes of a virtual machine in the task processing method according to Embodiment 1 of the present invention.

Nodes of a DVM system include a distributed shared memory management node (DSM), a scheduler node, and a task execution container node. As shown in FIG. 3, the nodes are as follows.

The DSM is configured to support some transaction memories, which are implemented based on a snapshot mechanism of a task, in maintaining memory consistency, so as to provide unified logical address space for an upper-layer application. A snapshot is a data structure that may ensure transaction isolation of data and that records a usage status of a memory that is represented by a page at a time point, and the snapshot is a copy of a shared variable at a time point. The transaction memories ensure that a write operation on a memory in each task has a transaction characteristic. An idea of a transaction in a database is used for reference, and read and write operations on a shared variable is encapsulated into a transaction. During a transaction execution process, data read by a current task is not written by another thread, and data written by the current task is not read by another thread. When the transaction ends, a modification to the shared variable is exposed to another transaction. To support concurrent read and write operations on a shared variable and reduce overheads of data copy consistency, the present invention uses a snapshot to implement concurrent read and write operations on the shared variable and uses a method of update delaying to reduce the consistency overheads. Specific implementation of the distributed shared memory management node includes maintenance and management of global page information (such as actual storage location information of a page) and copy information; conversion between a memory address and a page; management of local page information, page table information updating, and page fault processing; copying and transmission of page information between nodes; and management work related to a snapshot, such as creating a memory snapshot, deleting a memory snapshot, and submitting a memory modification.

The scheduler node is configured to complete task management, data synchronization, and task synchronization. The task management includes task scheduling, task initialization, task execution, and task execution result processing. The data synchronization and the task synchronization include using a local distributed shared memory module to complete memory data synchronization and task synchronization. This node includes a task management module and a memory module. Functions of the memory module are conversion between a memory address and page information, and forwarding, to the distributed shared memory management node, a request of the task management module for creating a snapshot. When a task is ready to be executed, a memory module of a corresponding task execution container node is instructed to update a related memory page table entry. Main functions of the task management module are task management, data synchronization, and task synchronization. Specific functions of the scheduler node include: 1. task scheduling: selecting, by using a certain scheduling policy, a specific task to be executed on a corresponding task execution container; 2. preparation for task execution: creating a snapshot for memory space of an area of a task by invoking a local memory module; 3. task dispatch; 4. task execution result processing: for example, processing a submitted memory modification, and creating a snapshot for a newly created task; 5. transparently completing synchronization of global data and a task by using a memory module, to maintain memory consistency.

The task execution container node is configured to complete functions such as task execution, a feedback of an execution result, and a feedback for creating a new task. This type of node includes a task execution module and a memory module. Functions of the task execution module include booting a local memory module, receiving a task dispatched by a scheduler, creating a context of local running for the task, executing the task, and feeding back an execution result to the scheduler, for example, submitting a memory modification that may be required, or creating a new task. A function of the memory module is management of local page table information, including page table information updating and page fault processing.

The upper-layer application is applied to an instruction sequence compiled by the data center virtual machine instruction set architecture.

As shown in FIG. 1, a procedure for the method includes the following steps.

101. When an instruction that is for creating a task and that is delivered by a virtual instruction layer is received, select, for the task, an idle resource used for executing the task, where the instruction includes at least a start address for running the task, and address information of a global variable and address information of a synchronization variable of the task.

102. Acquire, according to the address information of the global variable, global variable status information corresponding to the address information of the global variable.

103. Create a local global variable snapshot for the global variable according to the global variable status information.

104. Execute, in pre-allocated private memory space in the selected idle resource, the task according to a local global variable snapshot.

105. After the execution of the task is complete, acquire a new global variable snapshot corresponding to the global variable, and acquire an updated global variable according to the local global variable snapshot and the new global variable snapshot.

106. Determine whether a synchronization variable of a to-be-executed task in a task synchronization waiting queue includes the current updated global variable, and if the synchronization variable of the to-be-executed task in the task synchronization waiting queue includes the current updated global variable, put the task into a task execution waiting queue.

The task synchronization waiting queue is a queue in which a task waiting for triggering of a synchronization variable is located, and after a synchronization variable of a task in the task synchronization waiting queue is triggered, the task is put into the task execution waiting queue to queue up for scheduling; the task execution waiting queue is a queue in which a task waiting for scheduling and execution is located.

In this embodiment of the present invention, by sensing a global variable of each task when scheduling and executing the task, and properly allocating a memory to the global variable of the task when scheduling the task, a virtual machine tries, as much as possible, to make that memory addresses of global variables of various tasks do not conflict with each other, thereby reducing overheads that are generated, with the purpose of maintaining memory consistency, by a virtual machine system, and improving scalability of the virtual machine system.

Embodiment 2

Figure 4:
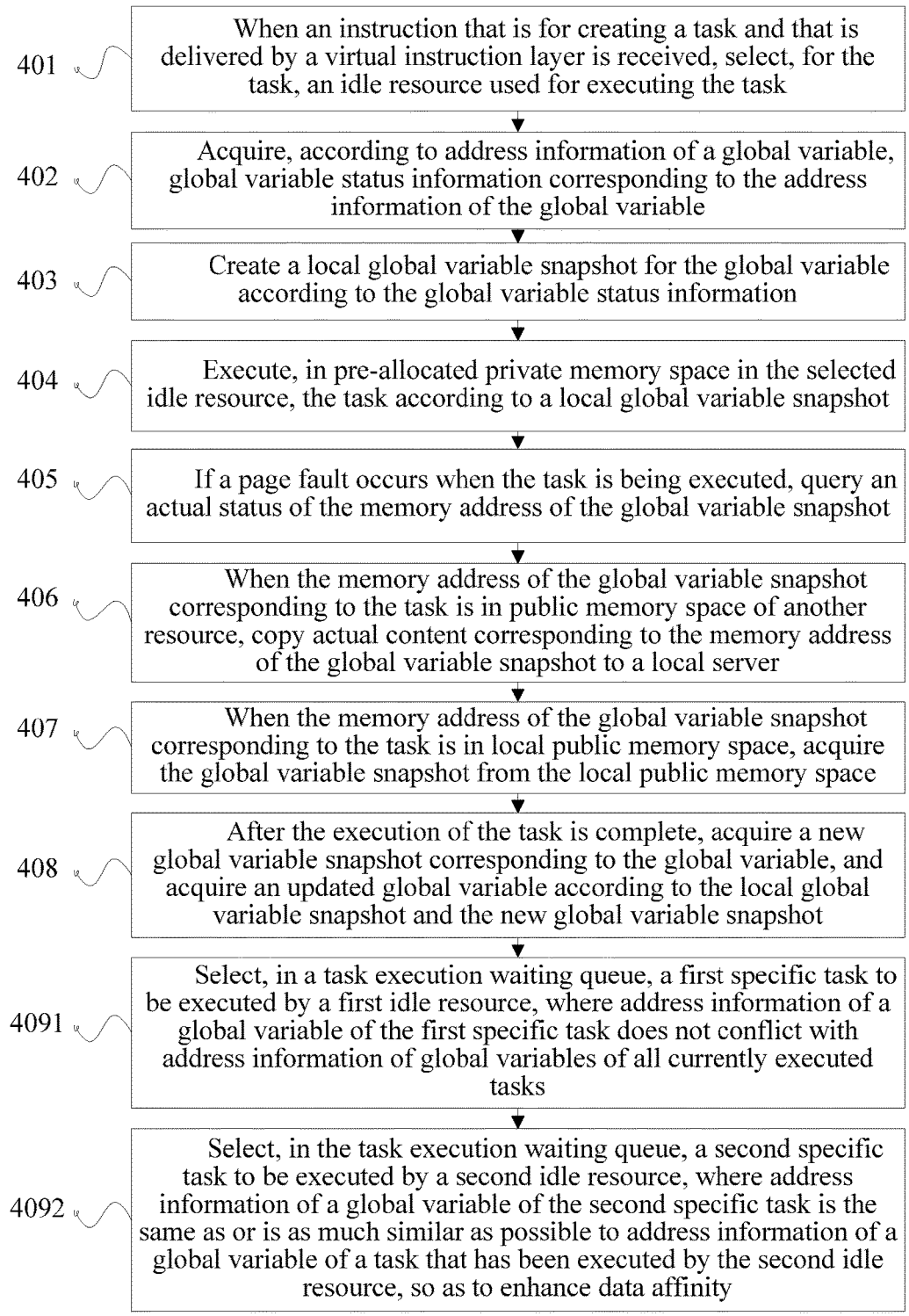
FIG. 4 is a flowchart of a task processing method according to Embodiment 2 of the present invention.

Referring to FIG. 4, this embodiment of the present invention provides a task processing method. It should be noted that, in this embodiment of the present invention, an entire process of task processing is executed by using a scheduler node, a distributed shared memory management node, and a task execution container node.

A procedure for the method includes the following steps.

A virtual machine includes a scheduler node, a distributed shared memory management node, and a task execution container node.

401. When an instruction that is for creating a task and that is delivered by a virtual instruction layer is received, select, for the task, an idle resource used for executing the task, where the instruction includes at least a start address for running the task, and address information of a global variable and address information of a synchronization variable of the task.

When the instruction that is for creating the task and that is delivered by the virtual instruction layer is received, the scheduler node selects an idle task execution container node from idle task execution container nodes to execute a task allocated by the scheduler node, where the selected idle task execution container node may be a task execution container node that the entire task execution container node is in an idle state, or may be a task execution container node that idle memory exists in private memory space of the task execution container node; and allocates the task to the task execution container node. The instruction carries related information of the task, including at least the start address for executing the task, and the address information of the global variable and the address information of the synchronization variable of the task, where the synchronization variable is also a type of global variable, and is used to identify whether the task needs to be synchronized with another task. When the task needs to be synchronized with another task, the scheduler node puts the task into a task synchronization waiting queue to wait until completion of an update of the global variable by completion of another task, where the task synchronization waiting queue is a queue in which a task waiting for triggering of a synchronization variable is located, and after a synchronization variable of a task in the task synchronization waiting queue is triggered, the task is put into the task execution waiting queue to queue up for scheduling; the task execution waiting queue is a queue in which a task waiting for scheduling and execution is located.

A task management module of the scheduler node is an entry point of an entire data center virtual machine system. After being initialized, the task management module establishes a connection with a task execution module of each task execution container node; starting from a first task of the system, the task management module selects, by using a certain scheduling policy, a task execution container node that is currently in the idle state, and allocates the task to the selected task execution container node.

When the task execution container node is booted, the task execution module of the task execution container node first initializes a private memory area of the node, and then starts two types of server sides, where a function of one type of server side is waiting to establish a connection with the scheduler node, and a function of the other type of server side is waiting to establish a connection with another task execution container node. Initialization of a local memory module is complete, and a shared memory area is set to be inaccessible. When access occurs, different page faults are caused, which activates the local memory module.

402. Acquire, according to the address information of the global variable, global variable status information corresponding to the address information of the global variable.

The global variable status information includes a memory address, a creation time and a version tag of the global variable.

403. Create a local global variable snapshot for the global variable according to the global variable status information.

A specific manner of creating the snapshot is copying the global variable status information according to the global variable status information, so as to generate the global variable snapshot of the global variable.

A specific implementation manner is as follows. The scheduler node initializes running data of the task, and schedules the distributed shared memory management node to create the snapshot for the global variable of the task.

The task management module of the scheduler node invokes the local memory module to implement conversion from a memory address of the running data of the task to page information, sends a data packet to the distributed shared memory management node by using the local memory module, and completes creation of the global variable snapshot of the task, where the running data of the task is information such as initial data in a heap and a stack of the task, an accessed memory address of the global variable, and a start address for running the instruction.

The page information corresponding to the memory address of the global variable of the task is sent to the distributed shared memory management node by using the local memory module. The distributed shared memory management node creates the snapshot for the global variable of the task, and saves original page table information corresponding to a page on which the memory address of the global variable of the task is located.

After the distributed shared memory management node creates the global variable snapshot, the task management module of the scheduler node invokes the local memory module to send the snapshot in data packet form to the memory module of the previously selected task execution container node, and the memory module of the task execution container node updates local page table information according to the snapshot. After the update of the page table information is complete, the task management module of the scheduler node sends, by using the established connection and in message form, the running data of the task to the corresponding task execution module of the task execution container node, and keeps listening to a message on the connection. Then, distribution of one task is complete.

404. Execute, in pre-allocated private memory space in the selected idle resource, the task according to a local global variable snapshot.

When receiving a message of instructing, by the scheduler node, the task execution container node to execute the task, the task execution container node executes the task. Each task execution container node includes pre-allocated private memory space and pre-allocated public memory space, where the private memory space, invisible to the outside, is the local memory module of the task execution container node and is configured to execute a task after the task is allocated to the task execution container node, and execute a task and a program that the task execution container node needs to execute; the public memory space is to be invoked by the entire virtual machine system as required.

405. If a page fault occurs when the task is being executed, query an actual status of the memory address of the global variable snapshot.

After receiving the message, the task execution module of the task execution container node executes the task. During a task execution process, when the global variable snapshot of the task is invoked, the global variable snapshot saves only the address information of the global variable, that is, the memory address, which causes that, when the global variable is invoked, it is found that the global variable may not be at a memory address of a local task execution container node; therefore, different page faults are triggered.

A specific operation process is as follows. The task execution container node sends query information to the distributed shared memory management node, and receives feedback information from the distributed shared memory management node.

406. When the memory address of the global variable snapshot corresponding to the task is in public memory space of another resource, copy actual content corresponding to the memory address of the global variable snapshot to a local server.

When a page fault occurs during the task execution process, the local memory module queries, by sending a message to the distributed shared memory management node, an actual location of page information corresponding to the global variable snapshot, and if the page information is in another container, the local memory module copies actual content of the page information to the local server by using a connection between task execution container nodes.

A specific operation process is as follows. When the page information that is of the global variable snapshot corresponding to the task and that is in the feedback information is in another task execution container node, the local task execution container node copies, by using the connection between the task execution container nodes, the actual content that is corresponding to the page information corresponding to the global variable snapshot to the local server.

407. When the memory address of the global variable snapshot corresponding to the task is in local public memory space, acquire the global variable snapshot from the local public memory space.

A specific operation process is as follows. When the page information that is of the global variable snapshot corresponding to the task and that is in the feedback information is in the local task execution container node, acquiring the global variable snapshot from a cache of the public memory space of the local task execution container node.

408. After the execution of the task is complete, acquire a new global variable snapshot corresponding to the global variable, and acquire an updated global variable according to the local global variable snapshot and the new global variable snapshot.

The scheduler node acquires the local global variable snapshot after the execution of the task is complete, and the new global variable snapshot that is of the global variable corresponding to the local global variable snapshot and that is saved in the distributed shared memory management node, where the new global variable snapshot is also a copy corresponding to the global variable. A case in which an update has been performed on the global variable by execution of another task; therefore, the new global variable snapshot may be different from the local global variable snapshot, and this comparison result is obtained by performing comparison between version tags in various global variable snapshots. If the version tags are the same, it indicates that no another task performs a modification on the global variable, and therefore, an update may be performed on the global variable; if the version tags are different, it indicates that another task has performed an update on the global variable before the task modifies the local global variable snapshot, and therefore, the current global variable cannot be updated to the local global variable snapshot. In this case, before the global variable is updated, whether an update can be performed needs to be determined by comparing the new global variable snapshot with the local global variable snapshot.

Therefore, step 408 may be determining whether a version tag in the local global variable snapshot is the same as a version tag in the new global variable snapshot, where if the version tag in the local global variable snapshot is the same as the version tag in the new global variable snapshot, it indicates that the global variable is not updated by another task, and if the version tag in the local global variable snapshot is different from the version tag in the new global variable snapshot, it indicates that the global variable has been updated by another task.

Further, after the execution of the task is complete, a different message may be sent according to an execution result, and the scheduler node performs, according to a message type, an operation of updating the global variable or discards processing on the executed task and the global variable snapshot of the executed task.

After receiving a message returned by the task execution module of the task execution container node, the task management module of the scheduler node performs different processing according to different message content. A specific form of the message has the following types: normal exit, abort and exit, and creating a child task.

When a message type is normally exits:

When the execution of the task is complete and a message of normal exit is sent, whether the global variable snapshot is modified after the task is executed is determined.

A specific operation process is as follows. When the execution of the task is complete, the scheduler node receives the message of normal exit sent by the task execution container node.

If the global variable snapshot is modified, whether status information of the global variable in the global variable snapshot is the same as current status information of the global variable is determined. If the status information of the global variable in the global variable snapshot is the same as the current status information of the global variable, the global variable snapshot is saved in public memory space in a resource that executes the task, and the memory address of the global variable is updated to a memory address that is for saving the global variable snapshot and that is in the public memory space in the resource that executes the task; if the status information of the global variable in the global variable snapshot is different from the current status information of the global variable, a step of aborting and exiting the task is executed.

If the global variable snapshot corresponding to the task is modified, whether an original global variable corresponding to the global variable snapshot has been updated at this time is first determined by comparing status information of the global variable in the global variable snapshot with status information of the original global variable. If the status information of the global variable in the global variable snapshot is the same as the status information of the original global variable, it indicates that the original global variable is not updated, and in this case, an update operation may be performed; if the status information of the global variable in the global variable snapshot is different from the status information of the original global variable, it indicates that an update has been performed on the global variable by another task, and in this case, no update operation can be performed, abort processing needs to be performed on the executed task, and the processed task enters the waiting queue again and waits to be executed again. This ensures that the updated global variable is not updated again by another concurrently executed task, thereby reducing system overheads that are used for maintaining, when concurrent read and write are performed on the global variable, data consistency.

For the global variable that may be updated, the scheduler node schedules the distributed shared memory management node to update page information of the original global variable, and receive page information that is of the global variable and that is updated by the distributed shared memory management node.

A specific operation process is as follows.

The scheduler node sends a submission message to the task execution container node, where the submission message enables the task execution container node to save a modified global variable snapshot into the task execution container node, and instructs the task execution container node to report page information corresponding to a page of the modified global variable snapshot.

The scheduler node receives the page information that is of the modified global variable snapshot and that is sent by the task execution container node, writes an identifier of the task execution container node to the page information, and sends the page information and the global variable snapshot to the distributed shared memory management node.

The distributed shared memory management node updates a global variable snapshot according to the page information and the global variable snapshot that are received. The distributed shared memory management node determines whether currently only one task execution container node has performed a modification on the global variable snapshot. If a task executed by only one task execution container node performs a modification on a global variable snapshot corresponding to the task, the distributed shared memory management node replaces the page information of the original global variable with page information of a page on which a modified global variable snapshot is located, and sends a submission success message to the scheduler node, where the submission success message carries the page information of the modified global variable snapshot.

If the global variable snapshot is not modified, the global variable snapshot is deleted.

A specific operation process is as follows. If the global variable snapshot corresponding to the task is not modified, the scheduler node schedules the distributed shared memory management node to delete the global variable snapshot corresponding to the task, and schedules a task that waits in the task execution waiting queue.

When a message type is creating a child task:

When the execution of the task is complete and a message of creating a child task is sent, whether address information of a synchronization variable of the child task is empty is determined, where the message of creating the child task includes at least a start address of the child task and address information of a global variable of the child task. When the child task needs to be synchronized with another task, the message of creating the child task further includes the address information of the synchronization variable.

When the execution of the task is complete, the scheduler node receives the message that is of creating the child task and that is sent by the task execution container node.

If the address information of the synchronization variable of the child task is not empty, the address information of the synchronization variable of the child task is added into an observation area of the synchronization variable of the child task, and the child task is put into a global task synchronization waiting queue and waits to enter, after an update of the synchronization variable of the child task by another task is complete, a procedure for executing the child task.

A specific operation process is as follows. The scheduler node adds, into the observation area of the synchronization variable, a memory address range of the global variable of the child task, and puts the child task into the global task synchronization waiting queue to wait until an update of the global variable by the another child task is complete.

If the observation area of the synchronization variable is empty, it indicates that an update of the global variable by the another child task is complete; in this case, the scheduler node puts the child task into a global task execution waiting queue to queue up for task execution. When it is the turn for the child task to be executed, the scheduler node executes steps such as allocating a task execution container node to the child task and creating a snapshot.

If the observation area of the synchronization variable is not empty, an idle resource is selected for the child task, the status information of the global variable and the memory address of the global variable that are in the address information of the global variable of the child task are copied, a global variable snapshot is created for the child task, the global variable snapshot of the child task and the global variable snapshot of the task are combined, and the child task is executed in the selected idle resource.

A specific operation process of this step is the same as an execution process of a parent task of the child task, and details are not described herein again.

When a message type is abort and exit:

When the execution of the task is complete and a message of abort and exit is sent, the global variable snapshot is deleted.

A specific operation process is as follows. The scheduler node schedules the distributed shared memory management node to delete the global variable snapshot corresponding to the task.

409. Determine whether a synchronization variable of a to-be-executed task in a task synchronization waiting queue includes the current updated global variable, and if the synchronization variable of the to-be-executed task in the task synchronization waiting queue includes the current updated global variable, put the task into a task execution waiting queue.

The task synchronization waiting queue is a queue in which a task waiting for triggering of a synchronization variable is located, and after a synchronization variable of a task in the task synchronization waiting queue is triggered, the task is put into the task execution waiting queue to queue up for scheduling; the task execution waiting queue is a queue in which a task waiting for scheduling and execution is located.

When the execution of the task is complete, regardless of whether the message type is normal exit or abort and exit after the task is executed, when the virtual machine system selects a next task to be executed, the virtual machine system needs to consider memory addresses of global variables of all tasks currently being executed and of a task having been executed, and determines, according to the memory addresses of the global variables of the two types of tasks, which task that waits in the task execution waiting queue to be scheduled to enter an execution procedure. It is the scheduler node in the virtual machine system that executes this process.

According to the memory addresses of the global variables of all the tasks currently being executed and the memory address of the global variable of the task having been executed, there are two scheduling mechanisms. In this case, step 409 may be as follows.

4091. Select, in the task execution waiting queue, a first specific task to be executed by a first idle resource, where address information of a global variable of the first specific task does not conflict with address information of global variables of all currently executed tasks.

In this case, a task that does not conflict with a global variable of a task currently being executed is preferably selected for execution.

4092. Select, in the task execution waiting queue, a second specific task to be executed by a second idle resource, where address information of a global variable of the second specific task is the same as or is as much similar as possible to address information of a global variable of a task that has been executed by the second idle resource, so as to enhance data affinity.

In this case, a principle of data locality is used, where proximity of address information is proximity of memory addresses at which global variables are located; for example, a memory address of a global variable is 0x0010, and then it may be considered that a memory address such as 0x0011, 0x0012, or 0x000f is a "proximate" memory address. A memory address of a global variable of a task selected in the task execution waiting queue is the same as or is as much similar as possible to a memory address of a global variable of a previously completed task, an objective of which is to enhance data affinity. On the one hand, a cache hit ratio may be increased; on the other hand, when the memory address of the global variable of the selected task is the same as the memory address of the global variable of the previously completed task, the global variable may be directly acquired from a current task execution container node according to a global variable snapshot when the task is executed.

In this embodiment of the present invention, by sensing a global variable of each task when scheduling and executing the task, and properly allocating a memory to the global variable of the task when scheduling the task, a virtual machine tries, as much as possible, to make that memory addresses of global variables of various tasks do not conflict with each other, thereby reducing overheads that are generated, with the purpose of maintaining memory consistency, by a virtual machine system, and improving scalability of the virtual machine system.

Embodiment 3

Figure 5:
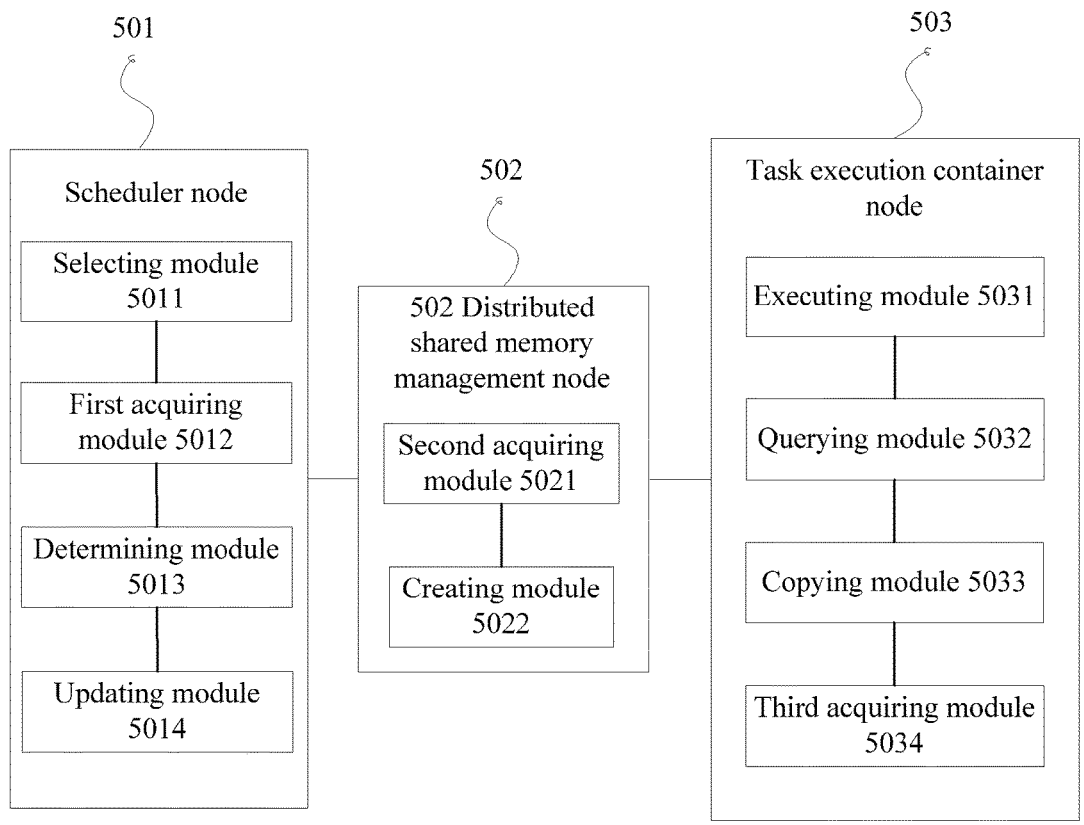
FIG. 5 is a schematic structural diagram of a task processing virtual machine according to Embodiment 3 of the present invention.

Referring to FIG. 5, this embodiment of the present invention provides a task processing virtual machine, where the virtual machine includes a scheduler node 501, a distributed shared memory management node 502, and a task execution container node 503; where the scheduler node 501 includes a selecting module 5011 configured to, when an instruction that is for creating a task and that is delivered by a virtual instruction layer is received, select, for the task, an idle resource used for executing the task, where the instruction includes at least a start address for running the task, and address information of a global variable and address information of a synchronization variable of the task; a first acquiring module 5012 configured to, after the execution of the task is complete, acquire a new global variable snapshot corresponding to the global variable, and acquire an updated global variable according to a local global variable snapshot and the new global variable snapshot; and a determining module 5013 configured to determine whether a synchronization variable of a to-be-executed task in a task synchronization waiting queue includes the current updated global variable, and if the synchronization variable of the to-be-executed task in the task synchronization waiting queue includes the current updated global variable, put the task into a task execution waiting queue; where the task synchronization waiting queue is a queue in which a task waiting for triggering of a synchronization variable is located, and after a synchronization variable of a task in the task synchronization waiting queue is triggered, the task is put into the task execution waiting queue to queue up for scheduling; the task execution waiting queue is a queue in which a task waiting for scheduling and execution is located; the distributed shared memory management node 502 includes a second acquiring module 5021 configured to acquire, according to the address information of the global variable, global variable status information corresponding to the address information of the global variable; a creating module 5022 configured to create a local global variable snapshot for the global variable according to the global variable status information; and the task execution container node 503 includes an executing module 5031 configured to execute, in pre-allocated private memory space in the selected idle resource, the task according to the local global variable snapshot.

In a specific implementation manner, the determining module 5013 includes a first processing unit 50131 configured to select, in the task execution waiting queue, a first specific task to be executed by a first idle resource, where a global variable of the first specific task does not conflict with global variables of all currently executed tasks; and a second processing unit 50132 configured to select, in the task execution waiting queue, a second specific task to be executed by a second idle resource, where a global variable of the second specific task is the same as or is as much similar as possible to a global variable of a task that has been executed by the second idle resource, so as to enhance data affinity.

The global variable status information includes a memory address, a creation time and a version tag of the global variable; the creating module 5022 is configured to copy the global variable status information according to the global variable status information, so as to generate the global variable snapshot of the global variable; and correspondingly, the first acquiring module 5012 is configured to determine whether a version tag in the local global variable snapshot is the same as a version tag in the new global variable snapshot, where if the version tag in the local global variable snapshot is the same as the version tag in the new global variable snapshot, it indicates that the global variable is not updated by another task, and if the version tag in the local global variable snapshot is different from the version tag in the new global variable snapshot, it indicates that the global variable has been updated by another task.

The scheduler node 501 further includes an updating module 5014 configured to, when the global variable is not updated by another task, save the local global variable snapshot into public memory space in a resource that executes the task, update a memory address of the global variable to a memory address that is for saving the global variable snapshot and that is of the public memory space in the resource that executes the task, and update the local global variable snapshot to the local global variable snapshot.

The task execution container node 503 further includes a querying module 5032 configured to, if a page fault occurs when the task is being executed, query an actual status of the memory address of the global variable snapshot; a copying module 5033 configured to, when the memory address of the global variable snapshot corresponding to the task is in public memory space of another resource, copy actual content corresponding to the memory address of the global variable snapshot to a local server; and a third acquiring module 5034 configured to, when the memory address of the global variable snapshot corresponding to the task is in local public memory space, acquire the global variable snapshot from the local public memory space.

In this embodiment of the present invention, by sensing a global variable of each task when scheduling and executing the task, and properly allocating a memory to the global variable of the task when scheduling the task, a virtual machine tries, as much as possible, to make that memory addresses of global variables of various tasks do not conflict with each other, thereby reducing overheads that are generated, with the purpose of maintaining memory consistency, by a virtual machine system, and improving scalability of the virtual machine system.

Embodiment 4

Figure 6:
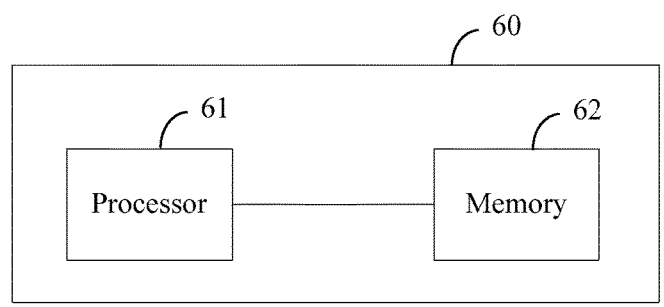
FIG. 6 is a schematic structural diagram of a computer device according to Embodiment 4 of the present invention.

Referring to FIG. 6, this embodiment further provides a computer device 60, including a processor 61 and a memory 62, where the memory stores code, and the processor is configured to read the code and executes the methods in the foregoing embodiments. In this embodiment, when the processor executes a method, functional units (or may be considered as several code segments with different functions at a code level) in each involved software may be considered as modules in Embodiment 3. For a specific execution method, reference may be made to the foregoing embodiments, and details are not described herein again.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:
1. A computer-implemented task processing method, wherein the method comprises:
  selecting, for a first task, an idle resource used for executing the first task when an instruction for creating the first task is received at a virtual machine from a virtual instruction layer, wherein the idle resource comprises a pre-allocated private memory space of a memory module of a task execution container node of the virtual machine, and wherein the instruction comprises address information of a global variable and address information of a synchronization variable of the first task;
  acquiring, according to the address information of the global variable, global variable status information corresponding to the address information of the global variable, wherein the global variable status information includes a creation time of the global variable;

creating a local global variable snapshot for the global variable according to the global variable status information;

executing, in the pre-allocated private memory space in the selected idle resource, the first task according to the local global variable snapshot;

acquiring a new global variable snapshot corresponding to the global variable;

acquiring a current updated global variable according to the local global variable snapshot and the new global variable snapshot after the execution of the first task is complete;

determining whether a synchronization variable of a to-be-executed task in a task synchronization waiting queue comprises the current updated global variable; and moving the to-be-executed task from the task synchronization waiting queue into a task execution waiting queue based on determining the synchronization variable of the to-be-executed task in the task synchronization waiting queue comprises the current updated global variable, wherein the task synchronization waiting queue is a queue in which the to-be-executed task is located until the synchronization variable of the to-be-executed task is triggered, and after the synchronization variable of the to-be-executed task in the task synchronization waiting queue is triggered, the to-be-executed task is put into the task execution waiting queue to queue up for scheduling, wherein the triggering is based on determining the synchronization variable of the to-be-executed task in the task synchronization waiting queue comprises the current updated global variable, and wherein the task execution waiting queue is a queue in which a task waiting for scheduling and execution is located.

2. The method according to claim 1, wherein determining whether the synchronization variable of the to-be-executed task in the task synchronization waiting queue comprises the current updated global variable and moving the to-be-executed task into the task execution waiting queue comprises selecting, in the task execution waiting queue, a second task to be executed using a second idle resource when address information of a global variable of the second task does not conflict with address information of global variables of all other tasks currently being executed.

3. The method according to claim 1, wherein determining whether the synchronization variable of the to-be-executed task in the task synchronization waiting queue comprises the current updated global variable and moving the to-be-executed task into the task execution waiting queue comprises selecting, in the task execution waiting queue, a second task to be executed using a second idle resource when address information of a global variable of the second task is the same as a global variable of a third task that has been executed using second idle resource, so as to enhance data affinity.

4. The method according to claim 1, wherein the global variable status information further comprises a memory address of the global variable and a version tag of the global variable, wherein creating the local global variable snapshot for the global variable according to the global variable status information comprises copying the global variable status information according to the global variable status information to generate the global variable snapshot of the global variable, and wherein acquiring the current updated global variable according to the local global variable snapshot and the new global variable snapshot comprises determining whether a version tag in the local global variable snapshot is the same as a version tag in the new global variable snapshot, wherein when the version tag in the local global variable snapshot is the same as the version tag in the new global variable snapshot, it indicates that the global variable is not updated by another task, and when the version tag in the local global variable snapshot is different from the version tag in the new global variable snapshot, it indicates that the global variable has been updated by another task.

5. The method according to claim 4, wherein after acquiring the current updated global variable according to the local global variable snapshot and the new global variable snapshot, the method further comprises, when the global variable is not updated by another task:

saving the local global variable snapshot into public memory space in a resource that executes the first task;

updating the memory address of the global variable to a memory address that is for saving the global variable snapshot and that is of the public memory space in the resource that executes the first task; and updating the global variable snapshot to the local global variable snapshot.

6. The method according to claim 1, wherein after executing, in the pre-allocated private memory space in the selected idle resource, the first task according to the local global variable snapshot, the method further comprises:

querying an actual status of a memory address of the global variable snapshot when a page fault occurs when the first task is being executed;

copying actual content corresponding to the memory address of the global variable snapshot to a local server when the memory address of the global variable snapshot corresponding to the first task is in public memory space of a resource allocated to a second task; and acquiring the global variable snapshot from a local public memory space when the memory address of the global variable snapshot corresponding to the first task is in the local public memory space.

7. The method according to claim 2, wherein after executing, in the pre-allocated private memory space in the selected idle resource, the first task according to the local global variable snapshot, the method further comprises:

querying an actual status of the memory address of the global variable snapshot when a page fault occurs when the first task is being executed;

copying actual content corresponding to the memory address of the global variable snapshot to a local server when the memory address of the global variable snapshot corresponding to the first task is in public memory space of another resource; and acquiring the global variable snapshot from a local public memory space when the memory address of the global variable snapshot corresponding to the first task is in the local public memory space.

8. The method according to claim 4, wherein after executing, in the pre-allocated private memory space in the selected idle resource, the first task according to the local global variable snapshot, the method further comprises:

querying an actual status of the memory address of the global variable snapshot when a page fault occurs when the first task is being executed;

copying actual content corresponding to the memory address of the global variable snapshot to a local server when the memory address of the global variable snapshot corresponding to the first task is in public memory space of another resource; and acquiring the global variable snapshot from a local public memory space when the memory address of the global variable snapshot corresponding to the first task is in the local public memory space.

9. A computer for implementing task processing, wherein the computer comprises:
one or more processors; and
a memory coupled to the one or more processors, wherein the memory stores one or more fixed sequences of instructions that, when executed by the one or more processors, cause the one or more processors to:
select, for a first task, an idle resource used for executing the task when an instruction for creating the first task is received at the one or more processors from a virtual instruction layer, wherein the idle resource comprises pre-allocated private memory space of a memory module of a task execution container node of the one or more processors, wherein the instruction comprises address information of a global variable and address information of a synchronization variable of the first task;
acquire, according to the address information of the global variable, global variable status information corresponding to the address information of the global variable, wherein the global variable status information includes a creation time of the global variable;
create a local global variable snapshot for the global variable according to the global variable status information;
execute in the pre-allocated private memory space in the selected idle resource, the first task according to the local global variable snapshot;
acquire a new global variable snapshot corresponding to the global variable and acquire a current updated global variable according to the local global variable snapshot and the new global variable snapshot after the execution of the first task is complete;
determine whether a synchronization variable of a to-be-executed task in a task synchronization waiting queue comprises the current updated global variable; and
move the to-be-executed task from the task synchronization waiting queue into a task execution waiting queue based on the synchronization variable of the to-be-executed task in the task synchronization waiting queue comprising the current updated global variable,
wherein the task synchronization waiting queue is a queue in which the to-be-executed task is located until the synchronization variable of the to-be-executed task is triggered, and after the synchronization variable of the to-be-executed task in the task synchronization waiting queue is triggered, the to-be-executed task is put into the task execution waiting queue to queue up for scheduling, wherein the triggering is based on determining the synchronization variable of the to-be-executed task in the task synchronization waiting queue comprises the current updated global variable, and
wherein the task execution waiting queue is a queue in which a task waiting for scheduling and execution is located.

10. The computer according to claim 9, wherein the one or more fixed sequences of instructions, when executed by the one or more processors, cause the one or more processors to:

select, in the task execution waiting queue, a second task to be executed using a first idle resource when address information of a global variable of the second task does not conflict with address information of global variables of all other tasks currently being executed by the one or more processors; and
select, in the task execution waiting queue, a third task to be executed using a second idle resource when a global variable of the third task is the same as a global variable of a fourth task that has been executed using the second idle resource to enhance data affinity.

11. The computer according to claim 9, wherein the global variable status information further comprises a memory address of the global variable and a version tag of the global variable, wherein the one or more fixed sequences of instructions, when executed by the one or more processors, cause the one or more processors to:
copy the global variable status information according to the global variable status information to generate the global variable snapshot of the global variable; and
determine whether a version tag in the local global variable snapshot is the same as a version tag in the new global variable snapshot, wherein when the version tag in the local global variable snapshot is the same as the version tag in the new global variable snapshot, it indicates that the global variable is not updated by another task, and when the version tag in the local global variable snapshot is different from the version tag in the new global variable snapshot, it indicates that the global variable has been updated by another task.

12. The computer according to claim 11, wherein when the global variable is not updated by another task, the one or more fixed sequences of instructions, when executed by the one or more processors, cause the one or more processors to:
save the local global variable snapshot into public memory space in a resource that executes the first task;
update a memory address of the global variable to a memory address that is for saving the global variable snapshot and that is of the public memory space in the resource that executes the first task; and
update the local global variable snapshot to the local global variable snapshot.

13. The computer according to claim 9, wherein the one or more fixed sequences of instructions, when executed by the one or more processors, cause the one or more processors to:
query an actual status of the memory address of the global variable snapshot when a page fault occurs when the first task is being executed;
copy actual content corresponding to the memory address of the global variable snapshot to a local server when the memory address of the global variable snapshot corresponding to the first task is in public memory space of another resource; and
acquire the global variable snapshot from the local public memory space when the memory address of the global variable snapshot corresponding to the first task is in public memory space of another resource.

14. The computer according to claim 10, wherein the one or more fixed sequences of instructions, when executed by the one or more processors, cause the one or more processors to:
query an actual status of the memory address of the global variable snapshot when a page fault occurs when the first task is being executed;
copy actual content corresponding to the memory address of the global variable snapshot to a local server when the memory address of the global variable snapshot corresponding to the first task is in public memory space of another resource; and acquire the global variable snapshot from a local public memory space when the memory address of the global variable snapshot corresponding to the first task is in the local public memory space.

15. The computer according to claim 11, wherein the one or more fixed sequences of instructions, when executed by the one or more processors, cause the one or more processors to:

query an actual status of the memory address of the global variable snapshot when a page fault occurs when the first task is being executed;

copy actual content corresponding to the memory address of the global variable snapshot to a local server when the memory address of the global variable snapshot corresponding to the first task is in public memory space of another resource; and acquire the global variable snapshot from a local public memory space when the memory address of the global variable snapshot corresponding to the first task is in the local public memory space.

* * * * *